US008831552B1

(12) United States Patent
He

(10) Patent No.: US 8,831,552 B1
(45) Date of Patent: Sep. 9, 2014

(54) RF BAND PASS FILTER WITH FEEDBACK CONTROL

(75) Inventor: Runsheng He, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 2604 days.

(21) Appl. No.: 11/265,074

(22) Filed: Nov. 1, 2005

Related U.S. Application Data

(60) Provisional application No. 60/691,011, filed on Jun. 15, 2005.

(51) Int. Cl.
*H04B 1/16* (2006.01)

(52) U.S. Cl.
USPC ............................ 455/339; 455/266; 455/296

(58) Field of Classification Search
USPC .......................................................... 455/339
See application file for complete search history.

(56) References Cited

U.S. PATENT DOCUMENTS

| | | | | |
|---|---|---|---|---|
| 5,136,267 | A * | 8/1992 | Cabot | 333/174 |
| 7,120,416 | B2 * | 10/2006 | Tomita | 455/340 |
| 7,450,693 | B2 * | 11/2008 | Kruse | 379/24 |
| 2001/0001759 | A1 * | 5/2001 | Holden et al. | 455/266 |
| 2004/0204105 | A1 * | 10/2004 | Liang et al. | 455/562.1 |
| 2005/0076148 | A1 * | 4/2005 | Chan et al. | 709/246 |
| 2005/0221789 | A1 * | 10/2005 | Pan | 455/339 |
| 2007/0178870 | A1 * | 8/2007 | Kerth | 455/313 |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.
IEEE Std 802.11a-1999 (Supplement to IEEE Std 802.11-1999) [Adopted by ISO/IEC and redesignated as ISO/IEC 8802-11: 1999/ Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.
IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

(Continued)

Primary Examiner — Ajibola Akinyemi

(57) ABSTRACT

A wireless receiver comprises a band-pass filter module that includes an input for receiving a first pilot signal, an output that generates a first signal based on the first pilot signal, and a control input for adjusting a center frequency of the band-pass filter module. A control module determines the energy of the first signal, generates a control signal based on the energy, and communicates the control signal to the control input of the band-pass filter module.

35 Claims, 7 Drawing Sheets

(56) References Cited

OTHER PUBLICATIONS

IEEE Std 802.11b-1999/Cor 1-2001 (Corrigendum to IEEE Std 802.11-1999); IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 2: Higher-Speed Physical Layer (PHY) extension in the 2.4 GHz Band—Corrigendum 1; LAN/MAN Standards Committee of the IEEE Computer Society; Nov. 7, 2001; 23 pages.

IEEE Std 802.11g/D2.8, May 2002 (Supplement to ANSI/IEEE Std 802.11, 1999 Edition) DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band; LAN/MAN Standards Committee of the IEEE Computer Society; 53 pages.

IEEE P802.11g/D8.2, Apr. 2003 (Supplement to ANSI/IEEE Std 802.11-1999(Reaff 2003)); DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in 2.4 GHz Band; LAN/MAN Standards Committee of the IEEE Computer Society; 69 pages.

IEEE Std 802.11h-2003 (Amendment to IEEE Std 802.11, 1999 Edition (Reaff 2003)); as amended by IEEE Stds 802.11a-1999, 802.11b-1999, 802.11b-1999/Cor 1-2001, 802.11d-2001 and 802.11g-2003;; IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; IEEE Computer Society LAN/MAN Standards Committee; Oct. 14, 2003; 74 pages.

802.11n; IEEE P802.11-04/0889r6; Wireless LANs, TGn Sync Proposal Technical Specification; 131 pages.

IEEE Std 802.16/2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE 802.20-PD-06, IEEE P 802.20 V 14, Jul. 16, 2004, Draft 802.20 Permanent Document, System Requirements for IEEE 802.20 Mobile Broadband Wireless Access Systems—Version 14, 23 pages.

\* cited by examiner

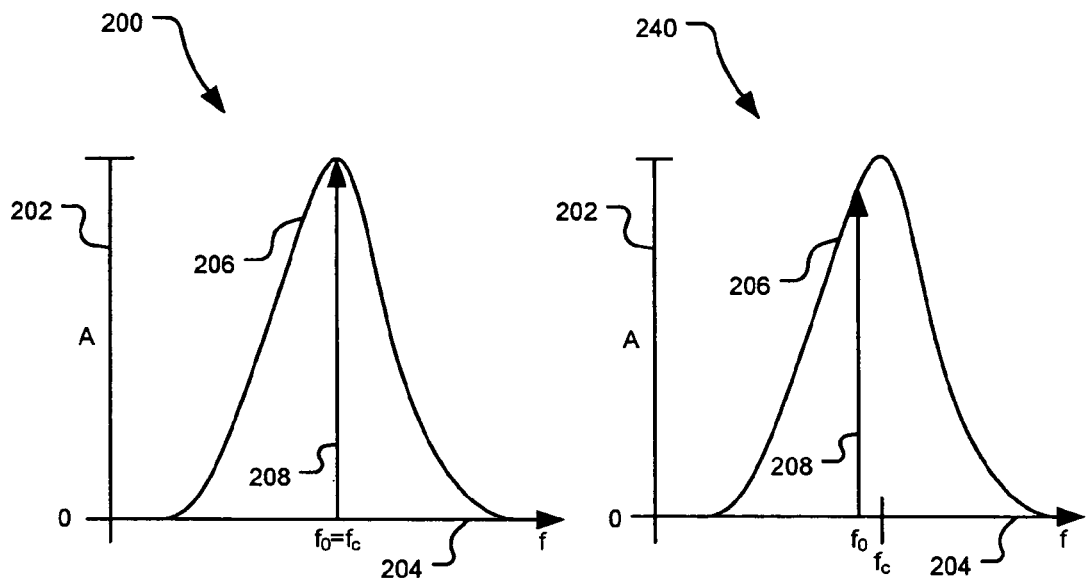
FIG. 4A
FIG. 4B
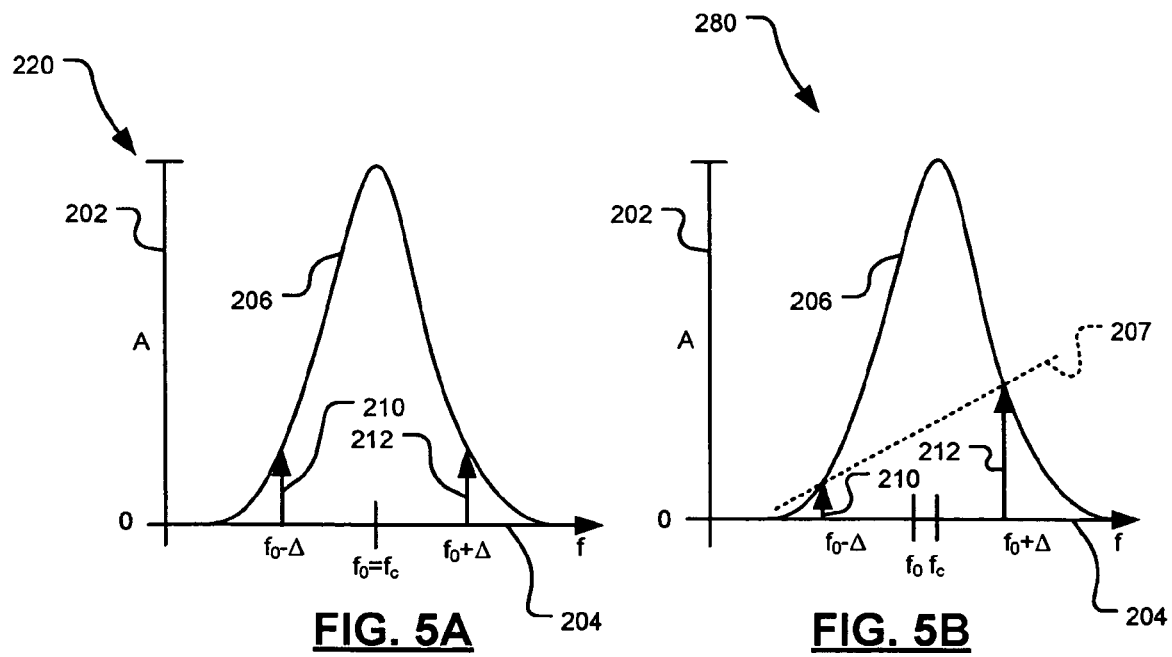
FIG. 5A
FIG. 5B

RF BAND PASS FILTER WITH FEEDBACK CONTROL

CROSS-REFERENCE TO RELATED APPLICATIONS

This application claims the benefit of U.S. Provisional Application No. 60/691,011, filed on Jun. 15, 2005. The disclosure of the above application is incorporated herein by reference in its entirety.

FIELD OF THE INVENTION

The present invention relates to band-pass filters (BPFs) and more particularly to BPFs in wireless receivers.

BACKGROUND OF THE INVENTION

A wireless receiver includes an antenna system that receives a signal of interest as well as background noise and interference. The wireless receiver therefore includes a tuner having one or more BPFs to isolate the signal of interest.

When designing a BPF, ideally the bandwidth (BW) of the pass-band should be equal to the BW of the signal of interest. One challenge to achieving this goal is tuning the BPF so that the pass-band is centered at the carrier frequency ($f_0$) of the signal of interest. If the pass-band is not centered, then the BPF introduces distortion to the signal of interest.

The challenge of centering the pass-band can be mitigated by increasing the BW of the BPF so that it is wider than the bandwidth of the signal of interest. However, increasing the BW of the BPF also increases the portion of undesirable signals that pass through it. These undesirable signals then reduce the linearity of the receiver. This distortion decreases the signal-to-noise ratio of the receiver and is at odds with the desire to maximize linearity of the receiver mode.

Referring now to FIG. 1, a radio-frequency (RF) tuner 10 of a receiver is shown. A signal Rx is received by an antenna system (not shown) and includes the signal of interest and the undesirable signals. The signal Rx is applied to an input of a first BPF 12 that rejects a substantial portion of the undesirable signals. An output of the first BPF 12 communicates with a low noise amplifier (LNA) 14. The LNA 14 amplifies the signal and applies it to a second BPF 16. The second BPF 16 generally has a narrower pass-band than the first BPF 12. The second BPF 16 communicates the signal of interest to a mixer 18. The mixer 18 receives a fixed-frequency signal from a local oscillator 20 and downconverts the frequency of the signal of interest. The mixer then provides the downconverted signal of interest to a baseband receiver 22 to be demodulated.

The linearity of the RF tuner 10 is dependent on the pass-bands of the first and second BPFs 12, 16 being centered upon the signal of interest and having the smallest possible BWs.

Referring now to FIG. 2, a schematic diagram is shown of a simple BPF 30. The received signal Rx is applied across a first parallel combination that includes a first inductor 32 and first adjustable capacitor 34. One end of the first parallel combinations connected to a reference node, such as a ground 40. The opposite end of the first parallel combination is connected to one end of a series combination that includes a second inductor 44 and a second adjustable capacitor 46. The opposite end of the series combination is connected to one end of a second parallel combination that includes a second inductor 50 and a second adjustable capacitor 52. The opposite end of the second parallel combination is connected to ground 40. Each of the adjustable capacitors 34, 46, and 52 can be implemented with a varactor and an associated bias voltage.

The components of the BPF 30 are selected and adjusted to simultaneously pass the signal of interest to output terminals 54 and shunt as much of the undesirable signals to ground 40. The effectiveness of the BPF 30 is affected by the accuracy of the capacitances of the first, second, and third adjustable capacitors 34, 46, and 52, respectively. If their capacitances vary, such as may occur over time, temperature, and/or humidity, the center frequency ($f_c$) of the BPF 30 will shift and its performance will deteriorate.

SUMMARY OF THE INVENTION

A wireless receiver comprises a band-pass filter module that includes an input for receiving a first pilot signal, an output that generates a first signal based on the first pilot signal, and a control input for adjusting a center frequency of the band-pass filter module. A control module determines the energy of the first signal, generates a control signal based on the energy, and communicates the control signal to the control input of the band-pass filter module.

In other features, a first local oscillator generates the first pilot signal. The band-pass filter receives a second pilot signal and generates a second signal based on the second pilot signal. The control module determines the energy of the second signal and bases the control signal on the energy of the second signal.

In still other features, a switch selectively connects a received signal to the input of the band-pass filter. The control module generates a switch signal for controlling the switch. The control module generates a switch signal for selectively operating the first local oscillator. A switch selectively connects a received signal to the input of the band-pass filter based on the switch signal.

In still other features, the first pilot signal is received via a wireless transmission. The wireless transmission includes a plurality of subcarrier frequencies. The control module varies the control signal until the energy of the first signal reaches a maximum value. The control module varies the control signal until the energy of the first signal and the energy of the second signal are equal.

In still other features, a sensor generates a sensor signal. The control module generates the control signal further based on the sensor signal. An amplifier receives the first signal and generates an amplified signal. A mixer receives the amplified signal, generates a third signal based on the amplified signal, and communicates the third signal to the control module. The control module determines the energy of the first signal based on the third signal. A demodulator receives the third signal and generates binary data based on the third signal. A media access controller (MAC) receives the binary data and generates data packets based on the binary data. A wireless transceiver includes a wireless transmitter and the wireless receiver.

In still other features, the wireless receiver is compliant with at least one of Institute of Electrical and Electronics Engineers (IEEE) standards 802.11, 802.11a, 802.11b, 802.11g, 802.11h, 802.11n, 802.16, 802.20, European Technical Standards Institute (ETSI) DVB-H, ETSI DVB-T, ETSI EN 300 401 V1.3.3, ETSI ES 201 980 V2.1.1, and National Radio Standards Committee (NRSC)-5.

In other features, a wireless receiver comprises band-pass filtering means for filtering and including input means for receiving a first pilot signal, output means for generating a first signal based on the first pilot signal, and center frequency adjusting means for adjusting a center frequency of the band-pass filtering means. The wireless receiver further includes control means for determining the energy of the first signal, for generating a control signal based on the energy, and for communicating the control signal to the center frequency adjusting means of the band-pass filtering means.

In still other features, the wireless receiver comprises first local oscillating means for generating the first pilot signal. The band-pass filtering means receives a second pilot signal and generates a second signal based on the second pilot signal. The control means determines the energy of the second signal and bases the control signal on the energy of the second signal.

In still other features, the wireless receiver comprises switching means for selectively connecting a received signal to the input means of the band-pass filtering means. The control means generates a switch signal for controlling the switching means. The control means generates a switch signal for selectively operating the first local oscillating means. The wireless receiver comprises switching means for selectively connecting a received signal to the input means of the band-pass filtering means based on the switch signal.

In still other features, the first pilot signal is received via a wireless transmission. The wireless transmission includes a plurality of subcarrier frequencies. The control means varies the control signal until the energy of the first signal reaches a maximum value. The control means varies the control signal until the energy of the first signal and the energy of the second signal are equal.

In still other features, the wireless receiver comprises sensor means for generating a sensor signal. The control means generates the control signal further based on the sensor signal. The wireless receiver comprises amplifying means for receiving the first signal and generating an amplified signal. The wireless receiver comprises mixing means for receiving the amplified signal, generating a third signal based on the amplified signal, and communicating the third signal to the control means. The control means determines the energy of the first signal based on the third signal.

In still other features, the wireless receiver comprises demodulating means for receiving the third signal and generating binary data based on the third signal. The wireless receiver comprises media access control means for receiving the binary data and generating data packets based on the binary data. A wireless transceiver includes wireless transmitting means for transmitting wireless signals and the wireless receiver.

In still other features, the wireless receiver is compliant with at least one of Institute of Electrical and Electronics Engineers (IEEE) standards 802.11, 802.11a, 802.11b, 802.11g, 802.11h, 802.11n, 802.16, 802.20, European Technical Standards Institute (ETSI) DVB-H, ETSI DVB-T, ETSI EN 300 401 V1.3.3, ETSI ES 201 980 V2.1.1, and National Radio Standards Committee (NRSC)-5.

In other features, a method for receiving wireless signals comprises providing a band-pass filter module that includes an input, an output, and a control input. A first pilot signal is received at the input. A first signal is generated at the output based on the first pilot signal. A center frequency of the band-pass filter module is adjusted at the control input. The energy of the first signal is determined. A control signal is generated based on the energy. The control signal is communicated to the control input.

In still other features, the first pilot signal is generated at a first local oscillator. A second pilot signal is received. A second signal is generated based on the second pilot signal. The energy of the second signal is determined. The control signal is based on the energy of the second signal. A received signal is selectively connected to the input of the band-pass filter.

In still other features, a switch signal for selectively connecting the received signal to the input of the band-pass filter is generated. A switch signal for selectively operating the first local oscillator is generated. A received signal is selectively connected to the input of the band-pass filter based on the switch signal.

In still other features, the first pilot signal is received via a wireless transmission. The wireless transmission includes a plurality of subcarrier frequencies. The control signal is varied until the energy of the first signal reaches a maximum value. The control signal is varied until the energy of the first signal and the energy of the second signal are equal.

In still other features, a sensor signal is generated. The control signal is generated based on the sensor signal. The first signal is received and an amplified signal is generated in response to the first signal. The amplified signal is received. A third signal is generated based on the amplified signal. The energy of the first signal is determined based on the third signal. The third signal is received. Binary data is generated based on the third signal. The binary data is received. Data packets are generated based on the binary data. A wireless transceiver implements the method for receiving wireless signals. A wireless receiver implements the method for receiving wireless signals. The method is compliant with at least one of Institute of Electrical and Electronics Engineers (IEEE) standards 802.11, 802.11a, 802.11b, 802.11g, 802.11h, 802.11n, 802.16, 802.20, European Technical Standards Institute (ETSI) DVB-H, ETSI DVB-T, ETSI EN 300 401 V1.3.3, ETSI ES 201 980 V2.1.1, and National Radio Standards Committee (NRSC)-5.

In other features, a computer program executed by a processor comprises receiving a first pilot signal at an input of a band-pass filter module. A first signal is generated at an output of the band-pass filter module based on the first pilot signal. A center frequency of the band-pass filter module is adjusted. The energy of the first signal is adjusted. A control signal is generated based on the energy. The control signal is communicated to the band-pass filter module.

In still other features, a second pilot signal is received. A second signal is generated based on the second pilot signal. The energy of the second signal is determined. The control signal is based on the energy of the second signal. A received signal is selectively connected to the input of the band-pass filter.

In still other features, a switch signal for selectively connecting the received signal to the input of the band-pass filter is generated. A switch signal is generated for selectively operating a first local oscillator that generates the first pilot signal. A received signal is selectively connected to the input of the band-pass filter based on the switch signal.

In still other features, the first pilot signal is received via a wireless transmission. The wireless transmission includes a plurality of subcarrier frequencies. The control signal is varied until the energy of the first signal reaches a maximum value. The control signal is varied until the energy of the first signal and the energy of the second signal are equal.

In still other features, a sensor signal is generated. The control signal is generated based on the sensor signal. The first signal is received and an amplified signal is generated in response to the first signal. The amplified signal is received. A third signal is generated based on the amplified signal. The energy of the first signal is determined based on the third signal. The third signal is received. Binary data is generated based on the third signal. The binary data is received. Data packets are generated based on the binary data. A wireless transceiver implements the computer program. A wireless receiver implements the computer program.

The computer program is compliant with at least one of Institute of Electrical and Electronics Engineers (IEEE) standards 802.11, 802.11a, 802.11b, 802.11g, 802.11h, 802.11n, 802.16, 802.20, European Technical Standards Institute (ETSI) DVB-H, ETSI DVB-T, ETSI EN 300 401 V1.3.3, ETSI ES 201 980 V2.1.1, and National Radio Standards Committee (NRSC)-5.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4A is a plot comparing a BPF center frequency ($f_0$) to received pilot signal energy when $f_c$ and $f_0$ are aligned;

FIG. 4B is a plot comparing $f_c$ to received pilot signal energy when the $f_c$ and $f_0$ are misaligned;

FIG. 5A is a plot comparing $f_c$ to received pilot signal energy when $f_c$ and $f_0$ are aligned and the pilot signal includes a plurality of frequencies;

FIG. 5B is a plot comparing $f_c$ to received pilot signal energy when $f_c$ and $f_0$ are misaligned and the pilot signal includes a plurality of frequencies;

DETAILED DESCRIPTION OF THE PREFERRED EMBODIMENTS

Figure 1:
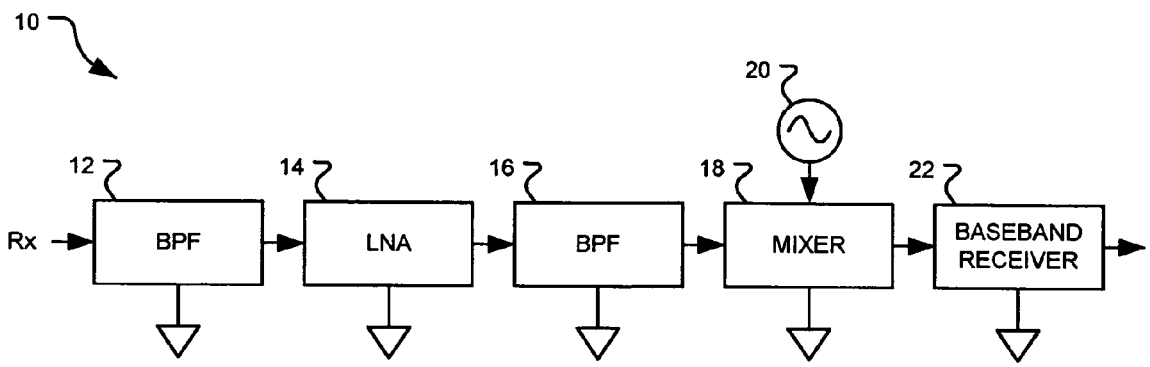
FIG. 1 is a functional block diagram of an RF tuner of the prior art.
Figure 2:
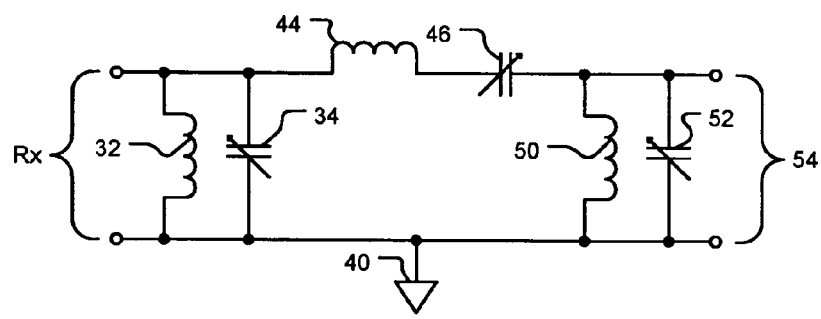
FIG. 2 is a schematic diagram of a BPF of the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

Figure 3:
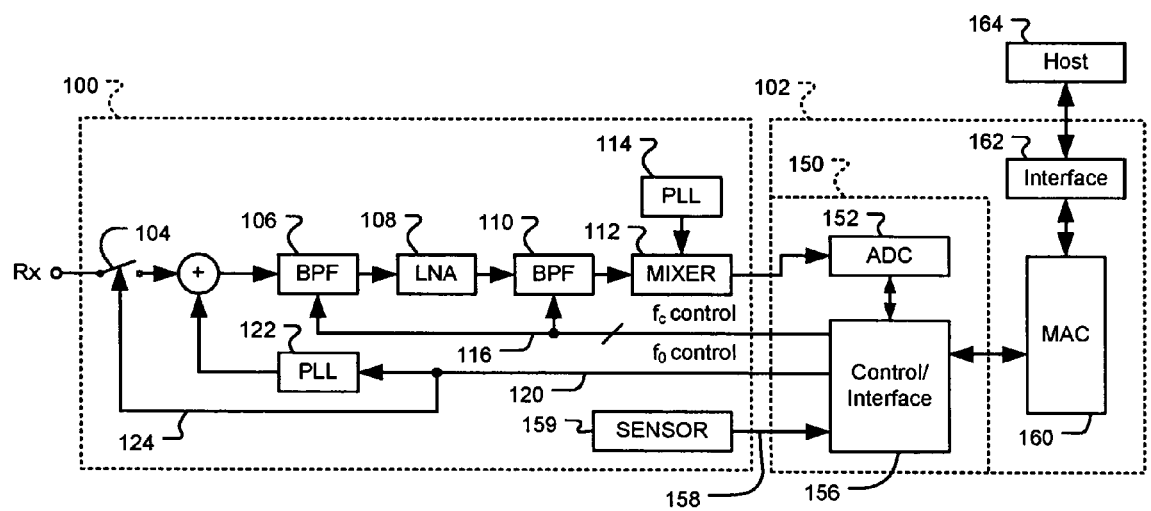
FIG. 3 is a functional block diagram of an improved RF tuner.

Referring now to FIG. 3, a functional block diagram is shown of an improved RF tuner 100 and baseband processor 102. The RF tuner 100 and baseband processor 102 can be implemented to be compatible with the Institute of Electrical and Electronics Engineers (IEEE) standards 802.11, 802.11a, 802.11b, 802.11g, 802.11h, 802.11n, 802.16, and/or 802.20. The RF tuner 100 and baseband processor 102 can also be implemented to be compatible with European Telecommunications Standard Institute (ETSI) Digital Video Broadcasting (DVB), Digital Audio Broadcasting (DAB), and Digital Radio Mondiale (DRM) standards, which are hereby incorporated by reference in their entirety. The RF tuner 100 and baseband processor 102 can also be implemented to be compatible with the National Radio Systems Committee (NRSC) In-band/On-channel Digital Radio Broadcasting Standard, NRSC-5, which is hereby incorporated by reference in its entirety.

The RF tuner 100 receives a signal $R_x$ from an antenna system (not shown). The signal $R_x$ includes a signal of interest and undesirable signals such as noise and interference. The signal Rx is applied to a switch 104 that selectively communicates the signal Rx to a first band-pass filter (BPF) 106. The first BPF 106 reduces the energy of the undesirable signals and communicates the filtered Rx signal to a low-noise amplifier (LNA) 108. The LNA 108 amplifies the filtered Rx signal and communicates it to a second BPF 110. The second BPF 110 has a bandwidth (BW) that is equal to or narrower than the first BPF 106. The second BPF 110 reduces the energy of the remaining undesirable signals and communicates a signal, which is now primarily comprised of the signal of interest, to a mixer 112. In some embodiments the second BPF 110 is omitted, in which case the output of the LNA 108 is applied to the input of the mixer 112. The mixer 112 also receives a signal from a first local oscillator 114 and downconverts the carrier frequency ($f_0$) of the signal of interest before communicating it to the baseband processor 102.

The RF tuner 100 receives a center control signal 116 that adjusts the center-frequency ($f_c$) of the first BPF 106 and second BPF 110. The baseband processor 102 generates the center control signal 116 in accordance with a method that is described later and used to periodically align $f_c$ with $f_0$.

The RF tuner 100 also receives a pilot control signal 120 that selectively activates a pilot signal generator 122 and opens the switch 104. In some embodiments, the pilot signal generator 122 generates a pilot signal 124 having the frequency $f_0$. In other embodiments, the pilot signal generator 122 generates a lower frequency ($f_0-\Delta$) and an upper frequency ($f_0+\Delta$), where $\Delta$ is a fixed frequency. The frequencies $f_0-\Delta$ and $f_0+\Delta$ should be selected so that they are within the pass-bands of both the first and second BPFs 106, 110.

The pilot signal 124 is communicated to the input of the first BPF 106 and continues to propagate through the LNA 108, second BPF 110, and the mixer 112. The baseband processor 102 receives the pilot signal from the mixer 112 and measures the remaining pilot signal energy. The baseband processor 102 then uses the measured energy to adjust the center control signal 116 as described below.

The baseband processor 102 will now be described in additional detail. A modem 150 receives the signal from the mixer 112. The signal is applied to an analog-to-digital converter (ADC) 152. The ADC 152 converts the signal to a binary format and communicates it to a control/interface module 156. The control/interface module 156 parses the binary signal for data and to determine the energy of the signal that the ADC 152 received. The control/interface module 156 communicates the data to a media access control module (MAC) 160. The MAC 160 formats the data into packets and communicates it to a host module 164 via an interface module 162. The host module 164 can include at least one of a number of digital appliances and/or computing devices that are described later herein. The control/interface module 156 can also receive a sensor signal 158 from a sensor 159. The sensor 159 can include a temperature sensor, a clock, etc. The control/interface module 156 generates the center control signal 116 and the pilot control signal 120 in accordance with methods that are described later herein.

Referring now to FIGS. 4A and 4B, plots are shown that indicate the relationship between $f_c$ and the energy of the pilot signal 124 having a single frequency $f_0$. An unscaled vertical axis 202 represents gain (A) and an unscaled horizontal axis 204 represents frequency (f). A curve 206 represents the combined pass-band of the first BPF 106 and/or the second BPF 110. A vertical arrow 208 represents the pilot signal as measured by the baseband processor 102. The length of the vertical arrow 208 indicates the magnitude of the energy.

In FIG. 4A, the length of the vertical arrow 208 is at a maximum, which indicates $f_c$ is aligned with $f_0$. When $f_c$ is misaligned with $f_0$, then the pilot signal energy will decrease from the maximum. Such a condition is shown in FIG. 4B. The baseband processor 102 can therefore monitor the pilot signal energy while it adjusts $f_c$ via the center control signal 116. When the pilot signal energy reaches its maximum value, the baseband processor 102 can hold the center control signal 116 constant to keep $f_c$ aligned with $f_0$.

Referring now to FIGS. 5A and 5B, plots are shown that indicate the relationship between $f_c$ and the energy of the pilot signal 124 that has two frequencies, $f_0-\Delta$ and $f_0+\Delta$. A first vertical arrow 210 represents the pilot signal at frequency $f_0-\Delta$. A second vertical arrow 212 represents the pilot signal at frequency $f_0+\Delta$. The pilot signals are measured by the baseband processor 102. The lengths of the first and second vertical arrows 210, 212 indicate the magnitude of their respective energies.

In FIG. 5A, the lengths of the first vertical arrow 210 and the second vertical arrow 212 are equal. Since $f_0-\Delta$ and $f_0+\Delta$ are centered about $f_0$, the equal lengths of the arrows indicate that $f_c$ is aligned with $f_0$. When $f_c$ is misaligned with $f_0$, then the pilot signal energies will differ between $f_0-\Delta$ and $f_0+\Delta$. Such a condition is shown in FIG. 5B. The baseband processor 102 can therefore monitor the difference between the pilot signal energies at $f_0-\Delta$ and $f_0+\Delta$ while it adjusts $f_c$. The baseband processor 102 can also use the polarity and magnitude of the difference, as exemplified by a dashed line 207, to determine which direction and amount to adjust $f_c$.

Figure 6:
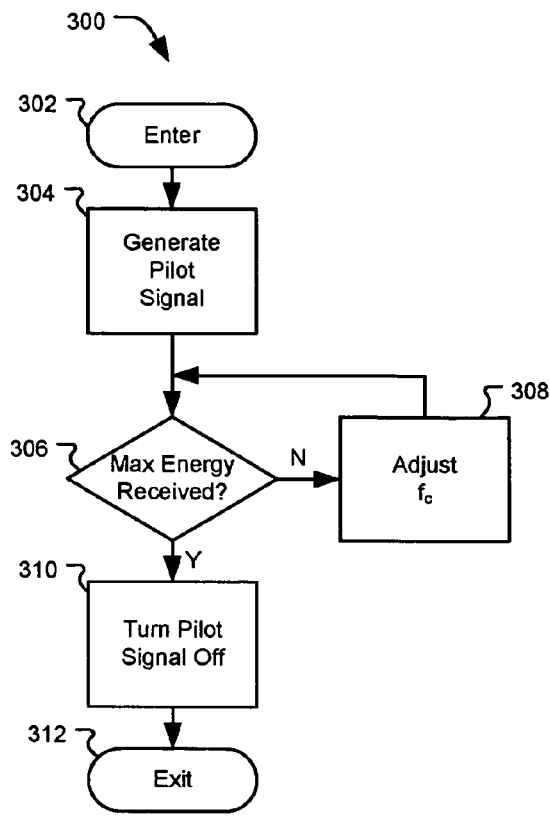
FIG. 6 is a flow chart of a method for adjusting $f_c$ using a single-frequency pilot signal.
Figure 7:
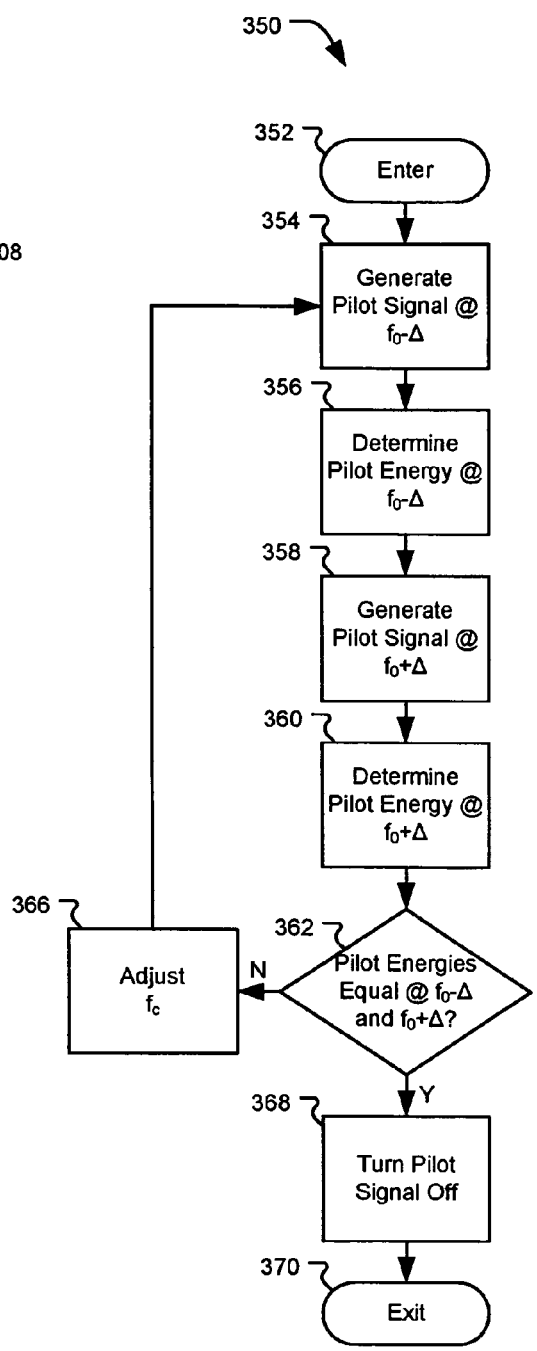
FIG. 7 is a flow chart of a method for adjusting $f_c$ using a multiple-frequency pilot signal.

Referring now to FIGS. 6 and 7, first and second methods 300 and 350 are respectively shown for adjusting $f_c$. The method 300 (FIG. 6) is suitable for use with the single frequency pilot signal as described above in FIGS. 4A and 4B. The method 350 (FIG. 7) is suitable for use with the pilot signal having lower and upper frequencies as described above in FIGS. 5A and 5B. The methods 300 and 350 can be stored as computer programs in the baseband processor 102 and executed as needed to align $f_c$ with $f_0$. In some applications, the selected method is executed only at power-up. In other applications, the selected method is executed when the sensor signal 130 exceeds a sensor signal threshold. In yet other applications, the selected method is executed periodically. In cases where the signal of interest is a burst-type signal, the selected method can be executed during quiet periods between each burst. Examples of burst-type signals include signals such as those used in the Institute of Electrical and Electronics Engineers (IEEE) 802.11a, 802.11g, and 802.11n protocols and the European Technical Standards Institute (ETSI) DVB-H protocol.

Referring now to FIG. 6, the first method 300 will be described in more detail. Control begins in block 302 and proceeds to block 304. In block 304, control uses the pilot control signal 120 to selectively generate the pilot signal 124. Control then proceeds to decision block 306 and determines whether the pilot signal energy passing through the first BPF 106 and/or the second BPF 110 is at a maximum. If the pilot signal energy is not at the maximum, then control proceeds to block 308 and uses the center control signal 116 to adjust $f_c$. Control then returns to decision block 306 and determines whether the pilot signal energy is at a maximum with the recently-adjusted $f_c$. Control continues to loop through blocks 306 and 308 until maximum amount of pilot signal energy is determined in decision block 306, at which control proceeds to block 310 and turns the pilot signal 124 off. Control then exits through block 312.

Referring now to FIG. 7, the second method 350 will be described in more detail. Control enters through block 352 and proceeds to block 354. In block 354, control generates the pilot signal 124 at the lower frequency $f_0-\Delta$. Control then proceeds to block 354 and measures the pilot signal energy at the lower frequency $f_0-\Delta$. Control then proceeds to block 358 and generates the pilot signal 124 at the upper frequency $f_0+\Delta$. Control then proceeds to block 360 and measures the pilot signal energy at the upper frequency $f_0+\Delta$. Control then proceeds to decision block 362 and determines the difference between the pilot signal energies at the lower frequency $f_0-\Delta$ and the upper frequency $f_0+\Delta$. If the difference is nonzero, then control branches to block 366 and uses the center control signal 116 to adjust $f_c$. The degree and direction that $f_c$ is adjusted can be based on the magnitude and/or polarity of the difference determined in decision block 362. Control then returns to block 354 from block 366 again generates the pilot signal 124 at the lower frequency $f_0-\Delta$ and the upper frequency $f_0+\Delta$. Control continues to loop through blocks 354-366 until the difference between the pilot signal energies is zero in decision block 362, at which point control proceeds to block 368 and turns the pilot signal 124 off. Control then exits through block 370.

Figure 8A:
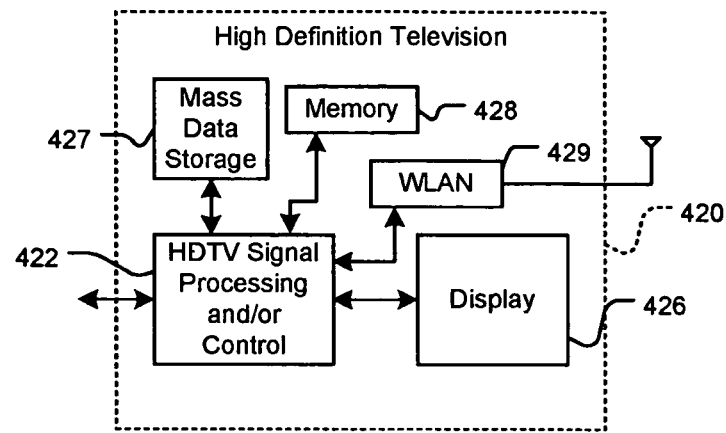
FIG. 8A is a functional block diagram of a wireless local area network (WLAN) interface in a high definition television.

Referring now to FIGS. 8A-8E, various exemplary implementations of the present invention are shown. Referring now to FIG. 8A, the present invention can be implemented in a high definition television (HDTV) 420. The present invention may implement a WLAN interface of the HDTV 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Figure 8B:
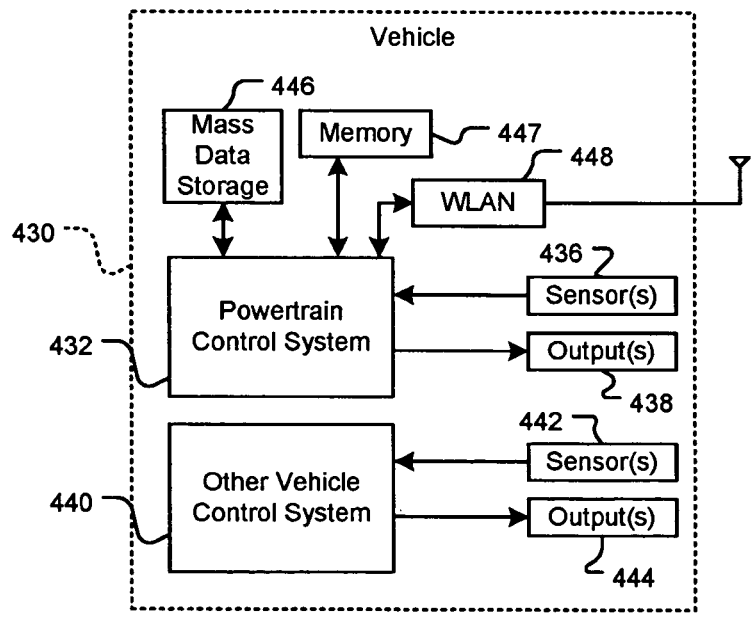
FIG. 8B is a functional block diagram of a WLAN interface in a vehicle control system.

Referring now to FIG. 8B, the present invention implements a WLAN interface of a vehicle control system. In some implementations, the present invention implement a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives HDD and/or DVDs. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 8C:
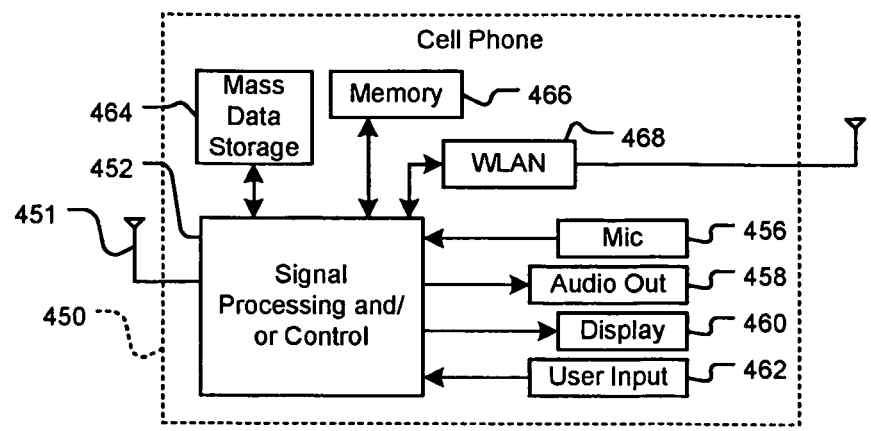
FIG. 8C is a functional block diagram of a WLAN interface in a cellular phone.

Referring now to FIG. 8C, the present invention can be implemented in a cellular phone 450 that may include a cellular antenna 451. The present invention may implement a WLAN interface of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 8D:
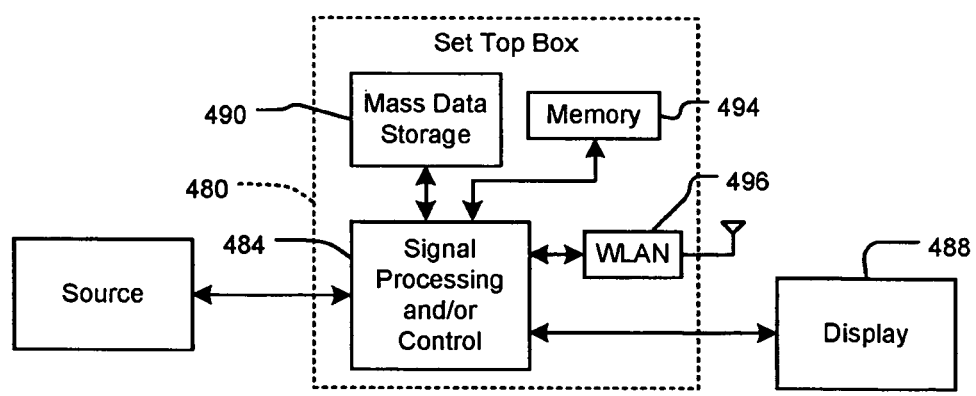
FIG. 8D is a functional block diagram of a WLAN interface in a set top box.

Referring now to FIG. 8D, the present invention can be implemented in a set top box 480. The present invention may implement a WLAN interface of the set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 8E:
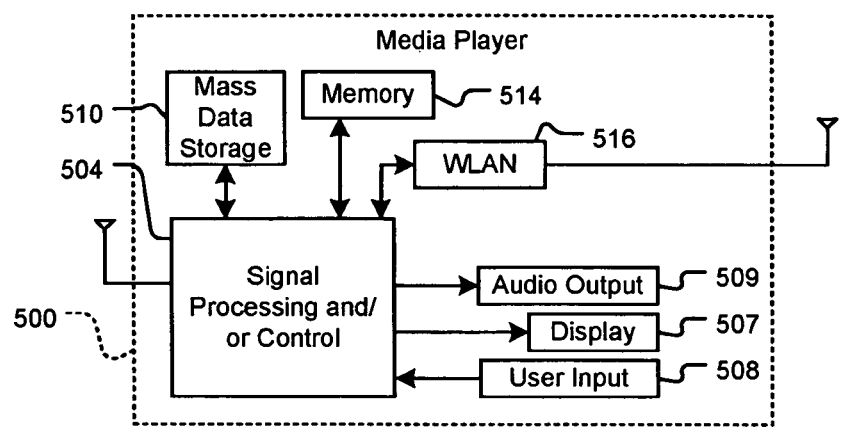
FIG. 8E is a functional block diagram of a WLAN interface in a media player.

Referring now to FIG. 8E, the present invention can be implemented in a media player 500. The present invention may implement a WLAN interface of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A wireless receiver comprising:
    a band-pass filter module that includes an input for receiving a first pilot signal, an output that generates a first signal based on the first pilot signal, and a control input for adjusting a center frequency of the band-pass filter module; and
    a control module that determines the energy of the first signal, generates a control signal based on the energy, and communicates the control signal to the control input of the band-pass filter module.

2. The wireless receiver of claim 1 further comprising a first local oscillator that generates the first pilot signal.

3. The wireless receiver of claim 2 wherein the control module generates a switch signal for selectively operating the first local oscillator.

4. The wireless receiver of claim 3 further comprising a switch that selectively connects a received signal to the input of the band-pass filter based on the switch signal.

5. The wireless receiver of claim 1 wherein the band-pass filter receives a second pilot signal and generates a second signal based on the second pilot signal; and
wherein the control module determines the energy of the second signal and further bases the control signal on the energy of the second signal.

6. The wireless receiver of claim 5 wherein the control module varies the control signal until the energy of the first signal and the energy of the second signal are equal.

7. The wireless receiver of claim 1 further comprising a switch that selectively connects a received signal to the input of the band-pass filter.

8. The wireless receiver of claim 7 wherein the control module generates a switch signal for controlling the switch.

9. The wireless receiver of claim 1 wherein the first pilot signal is received via a wireless transmission.

10. The wireless receiver of claim 9 wherein the wireless transmission includes a plurality of subcarrier frequencies.

11. The wireless receiver of claim 1 wherein the control module varies the control signal until the energy of the first signal reaches a maximum value.

12. The wireless receiver of claim 1 further comprising a sensor that generates a sensor signal;
wherein the control module generates the control signal based on the sensor signal.

13. The wireless receiver of claim 1 further comprising an amplifier that receives the first signal and generates an amplified signal.

14. The wireless receiver of claim 13 further comprising a mixer that receives the amplified signal, generates a third signal based on the amplified signal, and communicates the third signal to the control module;
wherein the control module determines the energy of the first signal based on the third signal.

15. The wireless receiver of claim 14 further comprising a demodulator that receives the third signal and generates binary data based on the third signal.

16. The wireless receiver of claim 15 further comprising a media access controller (MAC) that receives the binary data and generates data packets based on the binary data.

17. A wireless transceiver that includes a wireless transmitter and the wireless receiver of claim 1.

18. The wireless receiver of claim 1 wherein the receiver is compliant with at least one of Institute of Electrical and Electronics Engineers (IEEE) standards 802.11, 802.11a, 802.11b, 802.11g, 802.11h, 802.11n, 802.16, 802.20, European Technical Standards Institute (ETSI) DVB-H, ETSI DVB-T, ETSI EN 300 401 V1.3.3, ETSI ES 201 980 V2.1.1, and National Radio Standards Committee (NRSC)-5.

19. A method for receiving wireless signals comprising:
providing a band-pass filter module that includes an input, an output, and a control input;
receiving a first pilot signal at the input;
generating a first signal at the output based on the first pilot signal;
adjusting a center frequency of the band-pass filter module at the control input;
determining the energy of the first signal;
generating a control signal based on the energy; and
communicating the control signal to the control input.

20. The method of claim 19 further comprising generating the first pilot signal at a first local oscillator.

21. The method of claim 20 further comprising generating a switch signal for selectively operating the first local oscillator.

22. The method of claim 21 further comprising selectively connecting a received signal to the input of the band-pass filter based on the switch signal.

23. The method of claim 19 further comprising:
receiving a second pilot signal;
generating a second signal based on the second pilot signal;
determining the energy of the second signal; and
basing the control signal on the energy of the second signal.

24. The method of claim 23 further comprising varying the control signal until the energy of the first signal and the energy of the second signal are equal.

25. The method of claim 19 further comprising selectively connecting a received signal to the input of the band-pass filter.

26. The method of claim 25 further comprising generating a switch signal for selectively connecting the received signal to the input of the band-pass filter.

27. The method of claim 19 wherein the step of receiving the first pilot signal includes receiving the first pilot signal via a wireless transmission.

28. The method of claim 27 wherein the wireless transmission includes a plurality of subcarrier frequencies.

29. The method of claim 19 further comprising varying the control signal until the energy of the first signal reaches a maximum value.

30. The method of claim 19 further comprising:
generating a sensor signal; and
generating the control signal based on the sensor signal.

31. The method of claim 19 further comprising receiving the first signal and generating an amplified signal.

32. The method of claim 31 further comprising:
receiving the amplified signal;
generating a third signal based on the amplified signal; and
determining the energy of the first signal based on the third signal.

33. The method of claim 32 further comprising:
receiving the third signal; and
generating binary data based on the third signal.

34. The method of claim 33 further comprising:
receiving the binary data; and
generating data packets based on the binary data.

35. The method of claim 19 wherein the method is compliant with at least one of Institute of Electrical and Electronics Engineers (IEEE) standards 802.11, 802.11a, 802.11b, 802.11g, 802.11h, 802.11n, 802.16, 802.20, European Technical Standards Institute (ETSI) DVB-H, ETSI DVB-T, ETSI EN 300 401 V1.3.3, ETSI ES 201 980 V2.1.1, and National Radio Standards Committee (NRSC)-5.

* * * * *